United States Patent [19]

Renshaw et al.

[11] Patent Number: 4,545,519
[45] Date of Patent: Oct. 8, 1985

[54] METHOD AND APPARATUS FOR PREVENTING TIP STICKING DURING WELDING OPERATION

[75] Inventors: Theodore A. Renshaw, North Babylon; Joseph A. Curatolo, Jr., Jackson Heights, both of N.Y.

[73] Assignee: Fairchild Industries, Inc., Chantilly, Va.

[21] Appl. No.: 484,243

[22] Filed: Apr. 12, 1983

[51] Int. Cl.⁴ ............................................. B23K 20/10
[52] U.S. Cl. .................. 228/1.1; 156/580.2; 219/128
[58] Field of Search ............ 219/91.2, 91.21, 92, 219/94, 128; 228/110, 1.1; 156/580.2

[56] References Cited

U.S. PATENT DOCUMENTS

| | | | |
|---|---|---|---|
| 3,291,957 | 12/1966 | Bodine | 219/128 |
| 3,867,232 | 2/1975 | Thompson et al. | 156/580.2 |
| 4,080,229 | 3/1978 | Williams | 228/1.1 |
| 4,481,401 | 11/1984 | Humblot | 219/91.2 |

FOREIGN PATENT DOCUMENTS

| | | | |
|---|---|---|---|
| 24733 | 10/1969 | Japan | 91.2/ |
| 72751 | 6/1978 | Japan | 219/91.2 |

OTHER PUBLICATIONS

Cary, Howard B., *Modern Welding Technology*, 1979, pp. 226–227.

*Primary Examiner*—Kenneth J. Ramsey
*Attorney, Agent, or Firm*—Michael W. York

[57] ABSTRACT

A method is provided for preventing tip sticking during the spot welding of workpieces including ultrasonic vibratory spot welding. The welding apparatus includes a welding tip and a complimentary anvil between which the workpieces to be welded may be inserted. The welding tip is adapted to introduce into and through the workpieces sufficient amounts of energy to effect a weld between the workpieces. Shim material is inserted between the welding tip and the workpieces and/or between the anvil and the workpieces, said shim material having a hardness greater than the hardness of the workpieces. After insertion of the shim material, welding energy is then introduced through the shim material and the workpieces and welds are effected therebetween. The shim material is then torn away and discarded. Apparatus for effecting this method is further provided.

5 Claims, 4 Drawing Figures

METHOD AND APPARATUS FOR PREVENTING TIP STICKING DURING WELDING OPERATION

BACKGROUND OF THE INVENTION

The present invention relates generally to a spot welding method and apparatus and, more particularly, to such method and apparatus specifically adapted to prevent and/or minimize tip sticking, i.e. sticking of the welding tip to the workpieces, during ultrasonic vibratory spot welding.

Ultrasonic vibratory spot welding processes for joining together two or more similar or dissimilar materials have been used for a number of years. Until recently, however, such methods were limited to use on thermoplastics, non-woven fabrics and metals where weld strength and integrity were not particularly important. This limitation was due, in large measure, to the problems associated with the ultrasonic welding methods employed, most of which were in prototype stages. In those instances when weld strength and weld integrity were important, i.e., when joining together structural aircraft panels and the like, resistance spot welding procedures were used.

Ultrasonic spot welding procedures have recently demonstrated strong potential for improved sheet metal assembly at reduced cost when compared with resistance spot welding and adhesive bonding techniques. Early studies have indicated that welds effected using prototype ultrasonic welding equipment such as, for example, a Sonobond M-8000 ultrasonic spot welder, were superior to welds produced using conventional resistance spot welding procedures. These early trials indicated that for virtually any material combination, an ultrasonically produced spot weld has an ultimate yield strength of more than 2.5 times that of a weld produced using resistance spot welding equipment. Further tests indicated that ultrasonically produced spot welding can be accomplished with a 75% time and cost savings over conventional adhesive bonding techniques. Until now, however, ultrasonic spot welding for large structural metal parts was not possible in a production environment because of the numerous problems associated with the procedures.

Ultrasonic vibratory welding is a metallurgical joining technique which utilizes high frequency vibrations to disrupt the surface films and oxides and which, therefore, promotes interatomic diffusion and plastic flow between the surfaces in contact without any melting of the materials. Briefly stated, the ultrasonic welding process consists of clamping or otherwise securing together the workpieces under moderate pressure between the welding tip and a support anvil and then introducing high frequency vibratory energy into the pieces for a relatively short period of time, i.e., from a fraction of a second to a number of seconds. In many instances, the pieces to be welded are also adhesively bonded together by the insertion of an adhesive bonding agent between the juxtaposed pieces before welding which result in a high strength, uniform joint with superior static and fatigue properties.

One example of an ultrasonic spot welder particularly adapted for use on structural metal workpieces is the Sonobond Model M-8000 Ultrasonic Spot Welder marketed by Sonobond Corporation of West Chester, PA. This welder includes a transistorized, solid state frequency converter which raises standard 60 Hz electrical line frequency to 15–40 kHz and then amplifies the output. The high frequency electrical power travels through a lightweight cable to a transducer in the welding head where it is converted to vibratory power at the same frequency. The vibratory power is, thereupon, transmitted through an acoustic coupling system to the welding tip and then through the tip into and through the workpieces, with the vibratory energy effecting the weld.

The Sonobond M-8000 Ultrasonic Spot Welder includes a wedge-reed, transducer coupling system which transmits lateral vibrations of a perpendicular reed member attached to it so that the welding tip at the upper end of the reed executes shear vibrations on the surface of the workpieces. The transducer includes piezoelectric ceramic elements encased in a tension shell assembly and operates at a nominal frequency of 15 kHz. A solid state frequency converter with a transistorized hybrid junction amplifier powers the welder. The converter operates at a nominal frequency of 15 kHz with a power output variable up to about 4000 RMS RF watts. The welder may be tuned to a precise operating frequency. The frequency converter includes a wide-band RF power measuring circuit which samples output power and detects forward power and load power based on the principle of bi-directional coupling in a transmission line. The signal is processed electronically to provide true RMS values which are selectively displayed on an LED panel meter as either the forward or load power. Forward power is the output of the frequency converter delivered to the transducer in the welding head while load power is the transducer drive power acoustically absorbed in the work zone. The difference between the two readings is the reflected power induced by the load impedance mismatch and is minimized during the welding operation by impedance matching techniques.

In early trials using the prototype ultrasonic welding equipment, a serious "tip sticking" problem was encountered. The welding tip of the welder tended to adhere to the workpiece surfaces. The welding tips and anvils used in ultrasonic welding systems are considerably harder than the workpieces being welded and, as a result of both this and the metal flow which is induced by the vibratory power and clamp force application, the hardened welding tip oftentimes became smeared with the softer welded sheet. In early trials using the prototype ultrasonic welding equipment, the welding zones on the workpieces were characterized by torn and beaten aluminum and aluminum particles being transferred from the workpieces to the surface of the welding tip. After five or six welds, the material transfer tended to accelerate and the surface conditions of both the workpieces and welding tips deteriorated. As a result, it was found that the effective radius of the welding tip was enlarged by the build-up of material with a strong bond occurring between the welding tip and the metal sheet. At times, these bonds were as strong as the bonds formed between the metal workpieces being welded together.

Tip sticking occurs as a result of local scuffing in the region of the contact area where the contact pressure is minimal. It also appears to be associated with a flexural condition where the sheet at the edge of the spot repeatedly rises up and strikes the welding tip producing a flapping action. The problem is, however, less pronounced when welding thicker sheets, thus confirming this theory.

One solution to this "tip sticking" problem is to operate the welder at low power levels. This solution has, however, proved self-defeating since it precludes the generation of strong welds. A second solution is to replace the welding tips every fifth weld and clean them in a sodium hydroxide solution. Obviously, this second solution is not feasible for use in a production environment. The use of welding tips having different configurations and/or fabricated from different materials have also been tried. All of these attempts, however, have proven unsuccessful in overcoming this tip sticking problem.

The present invention utilizes the placement of one or more shims between the welding tip and the workpieces and/or between the anvil and the workpieces. The high frequency energy which is emitted from the welding tip then passes through the shim and into the workpieces causing a weld to occur not only between the workpieces but as well between the shim and the workpiece. The bond which occurs between the welding tip and the shim and/or between the anvil and the shim is a weak bond and is easily broken so as to permit a peeling away of the shim from the workpieces when welding is completed. A strong bond, however, occurs between the workpieces.

Somewhat similar approaches to this problem have been tried in the past. For example, U.S. Pat. No. 3,533,155, which issued on Oct. 13, 1970 to A. Coucoulas, teaches the bonding of minute electronic leads using a compliant medium. This technique utilized extremely low energy, i.e. 1 watt, to weld very soft material, i.e. gold. Soft aluminum was used as the compliant medium. In contrast, the method of the subject invention is directed to effecting structural bonds between strong structural alloys capable of carrying in excess of a ton of load in shear and uses 4000 watts to effect the weld. The soft compliant materials taught by Coucoulas are substantially different from the hard, non-compliant shims used in the present invention.

Against the foregoing background, it is a primary object other present invention to provide a method for preventing tip sticking during welding operations.

It is another object of the present invention to provide a method of maintaining power tips and anvils free of material pick-up from the workpieces.

It is yet another object of the present invention to provide such a method particularly adapted for use in association with ultrasonic or vibratory welding equipment.

It is still another object of the present invention to provide such a method which may be used in a production environment and which does not deleteriously affect the quality of the resultant weld.

It is yet still another object of the present invention to provide such a method which is relatively inexpensive and which may be used in a production environment.

It is still yet another object of the present invention to provide apparatus for effecting such methods.

BRIEF SUMMARY OF THE INVENTION

The present invention, in brief summary, comprises a method for preventing tip sticking during the ultrasonic vibratory spot welding of workpieces. The ultrasonic welder used includes a welding tip and a complimentary anvil which define a throat into which the workpieces to be welded may be inserted.

The welding tip is adapted to introduce into and through the workpieces high frequency vibratory energy in order to effect a bond therebetween. Shim material is inserted between the welding tip and the workpieces and/or between the anvil and the workpieces, said shim material having a hardness greater than the hardness of the workpieces. After insertion of the shim material, ultrasonic vibratory energy is then introduced through the shim material and the workpieces and bonds are effected therebetween. The shim material may then be peeled away and discarded. Apparatus for effecting this method is further provided.

BRIEF DESCRIPTION OF THE DRAWINGS

The foregoing and still other objects and advantages of the present invention will be more apparent from the detailed explanation of the preferred embodiment of the invention in connection with the accompanying drawings wherein.

DETAILED DESCRIPTION OF THE INVENTION

Figure 1:
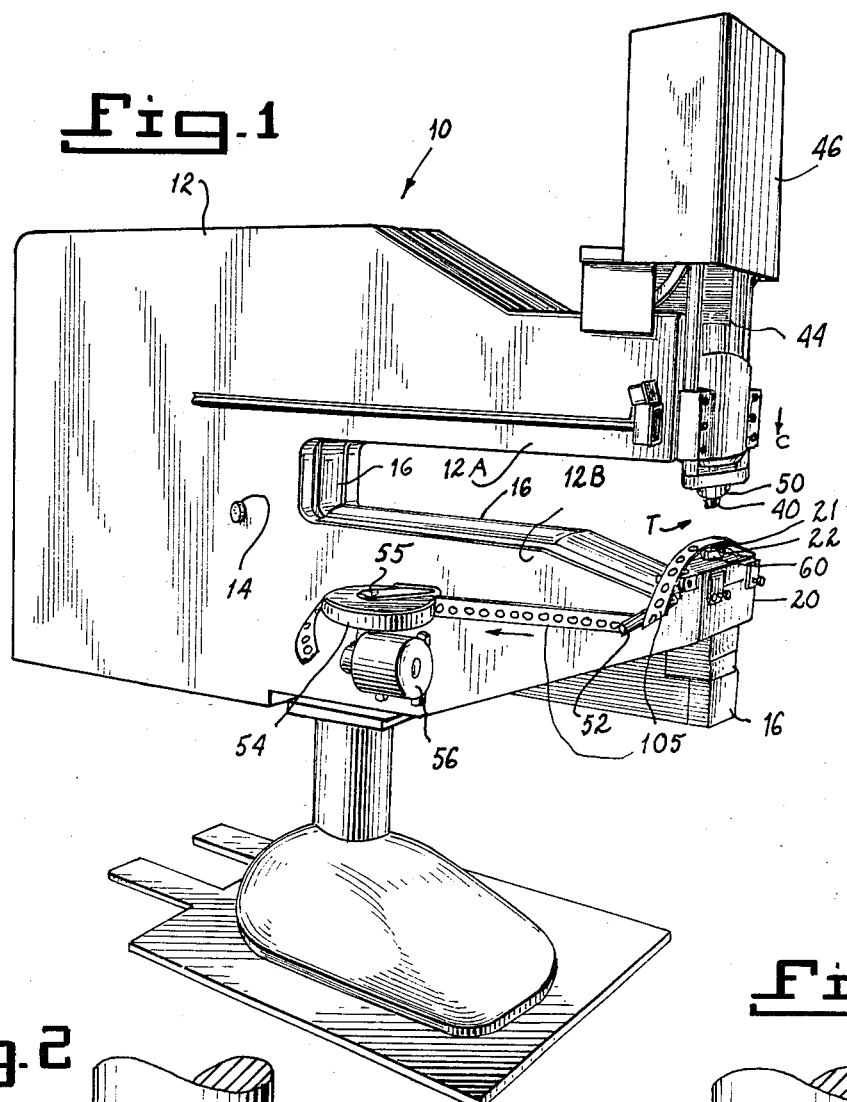
FIG. 1 is a perspective view of an ultrasonic vibratory welder which includes the tip sticking preventing apparatus of the subject invention.

An ultrasonic spot welding machine capable of welding together structural metal sheets, referred to generally by reference numeral 10, is illustrated in side perspective view in FIG. 1. Ultrasonic spot welder 10 includes a generally C-shaped clamping frame 12 pivotably mounted about pivot 14 and supported on a stationary central welder frame 16. Clamping frame 12 includes elongated upper and lower sections 12A and 12B, respectively, which, in combination with the central welder frame 16, define a throat T into which the workpieces to be welded may be inserted for welding.

A welding head 20, including a welding tip 21, which forms the end of a vibratory reed 22, is provided and is secured to stationary welder frame 16. A slideably mounted anvil 40 is provided on the opposite side of the throat. Collar clamps 50 and 60 are provided about the anvil 40 and the welding tip 21, respectively.

Figure 2:
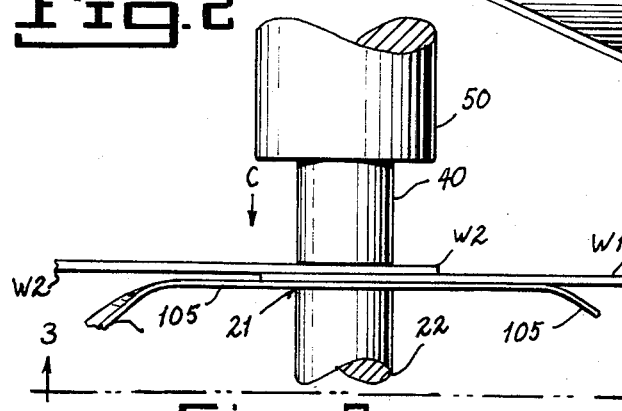
FIG. 2 is an enlarged front view illustrating the weld zone of FIG. 1 during an actual welding operation.
Figure 3:
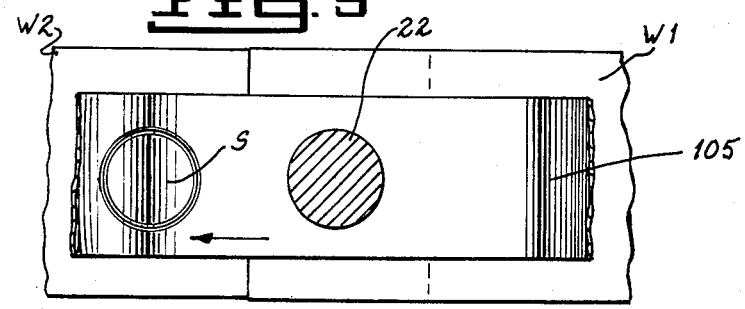
FIG. 3 is a sectional view taken along line 3—3 of FIG. 2.

Anvil 40, which is movable toward and away from welding tip 21 along anvil guide 44, is powered by at least one internally contained, hydraulic anvil cylinder contained with cylinder head 46. Movement of anvil 40 is independent of movement of collar clamp 50. When workpieces W1 and W2 to be welded (See FIGS. 2 and 3) are inserted into the throat between the anvil 40 and the welding tip 21, the anvil 40 is lowered in a clamping direction C toward welding tip 21 until, as shown in FIGS. 2-3, the workpieces are clamped together. This clamping action not only serves to clamp the workpieces together but, additionally, causes a compressive force to be applied between them. Spot welding of the workpieces may therefore be accomplished in the manner hereinafter described.

Vibratory reed 22, at its end opposite the welding tip 21, is connected to a transducer which is contained within welding frame 16. The transducer transmits lateral vibrations and induces flexural vibration of the reed 22 so that the welding tip 21 at the upper end of the reed 22 may introduce shear vibrations into workpieces W1 and W2. The transducer consists of piezoelectric ceramic elements encased in a tension shell assembly and is operated at a nominal frequency of about 15 kHz.

Spot welder 10, which is a modification of the Sonobond Model M-8000 ultrasonic spot welder, includes a frequency converter which incorporates a wide-band RF power measuring circuit for sampling the output power to detect the forward power and the load power based on the principle of directional coupling in a transmission line. The signal is processed electronically by internal circuitry to provide true RMS values which are displayed as either the forward power or the load power. Forward power is the output of the frequency converter delivered to the transducer in the welding tip 21 while load power is the transducer drive power that is acoustically absorbed in the weld zone. The difference between the forward power and the load power represents the reflected power induced by the load impedance mismatch and is minimized during subsequent welding operations by impedance matching techniques.

Welding tip 21 and anvil 40 are both fabricated from a generally hard metal such as, for example, steel hardened to about $R_c$ 50. The radii of the welding tip 21 may be between about 2" and about 20" and the shape and dimension of anvil 40 generally conforms to that of the welding tip 21.

As previously stated, the subject invention resides in a method of inserting shim material between welding tip 21 and one of the workpieces W1 to be welded and/or between anvil 40 and the other workpiece W2. Such a method has been found to substantially reduce or eliminate tip sticking which had, heretofore, resulted in the hardened welding tip 21 becoming smeared with the softer material of the workpiece W1. Workpiece W1 is typically stainless steel or aluminum or titanium alloys. As shown in FIG. 2, shim material 105 is inserted directly between the welding tip 21 and the lower workpiece W1 which is to be ultrasonically welded to upper workpiece W2. During the welding operation, the high frequency energy passes from the welding tip 21 through the shim material 105 and into the workpiece W1 and W2 which are held together by the compressive forces generated between welding tip 21 and anvil 40 as anvil 40 is moved in clamping direction C toward welding tip 21. The high frequency vibratory energy generated from welding tip 21 in combination with these compressive forces causes a spot weld S, as shown in FIG. 3, to be effected therebetween.

The shim material 105 used may be any metal, the hardness of which is greater than the hardness of the workpieces W1 and W2 being welded together so as to cause minimal bonding between the shim material 105 and the welding tip 21 or between the shim material 105 and workpiece W1. A strong bond however occurs between the softer workpieces W1 and W2. Optimal choices of shim materials 105 and the respective thicknesses thereof are dictated by cost as well as physical requirements, i.e., having limited deformability, ability to develop a minimal bond with the other elements, fatigue resistance, having no inclination to induce corrosion in the workpiece, etc. Particularly good results have been obtained when the shim material used is nichrome, brass, hardened beryllium copper, Inconel, tempered carbon steel, tempered carbon steel having a blue oxide coating and 15-5 pH alloy. Similarly, thickness of the shim material may vary widely depending on application although it is preferred that the thickness of the shim material be between about 0.002" and 0.010" and, most preferably, between about 0.003" and about 0.005".

As shown in FIG. 2, the shim material 105 is inserted directly between the welding tip 21 and the lower of the workpieces being welded together which results in a weld being effected between the shim material 105 and the two workpieces W1 and W2. After completion of welding because the shim material 105 is a relatively hard material, there tends to be little or no smearing or adherence of the shim material 105 on the welding tip 21. Additionally, because the shim material 105 is generally harder than the workpieces being welded, the bond between the shim material 105 and workpiece W1 has a very low tensile strength and is peel sensitive. Power transmission, which is in a shear mode, is not inhibited by the shim material 105 while peel strength, which is tensile mode dependent, is very low. As such, the shim material 105 tends to be easily separated from the workpieces W thus leaving the workpieces strongly bonded together.

Figure 4:
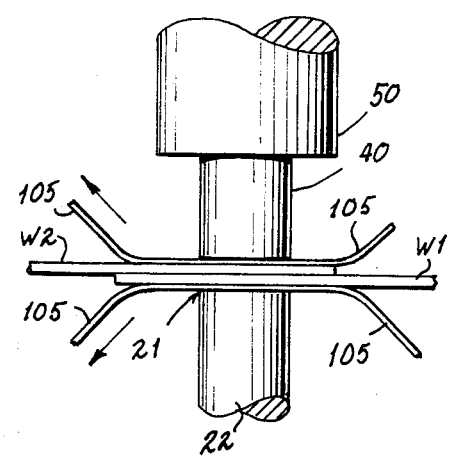
FIG. 4 is an enlarged front view illustrating the weld zone of an alternative embodiment of the subject invention.

FIG. 4 is illustrative of an alternative embodiment of the subject invention in which shim material is inserted both between the welding tip 21 and lower workpiece W1 and between the anvil 40 and the upper workiece W2. Such an arrangement prevents tip sticking between both the anvil 40 and the workpieces as well as between the welding tip 21 and the workpieces.

The manner in which the shim material 105 is inserted between the welding tip 21 and the lower workpiece W1, as in FIG. 2 or between both the welding tip 21 and the lower workpiece W1 and between the anvil 40 and the upper workpiece W2, as in FIG. 4, may vary depending upon the specific applications desired. A particularly preferred method of inserting the shim material 105 between the lower workpiece W1 and the welding tip 21 is illustrated in FIG. 1 wherein a continuous feed roll of shim material 105 is mounted on a rotatable bracket horizontally positioned on one side of the clamping frame 12 of the welder 10 (not shown). The shim material 105, which comes off this feed roll, is directed over welding tip 21, guided around guide 52 and is then wound around and collected by take-up roll 54 mounted on bracket 55. Take-up roll 54 is adapted to rotate in a clockwise direction, and is driven by motor 56. As take-up roll 54 rotates, it causes shim material 105 drawn from feed roll (not shown) to pass across the welding tip 21 and be collected on take-up roll 54. In this manner, motor 56 may be coordinated with the welding sequence of welder 10 so as to sequentially index shim material only after a weld is effected rather than continuously draw shim material 105 over the welding tip 21. This insures that fresh shim material 105 will always be positioned between the welding tip 21 and the workpieces W1 but none will be wasted. Use of fresh shim material is important to the objective of obtaining welds with repeatable properties; repeated use of shims spots on different welds would lead to the accumulation of welding debris and thereby cause progressive alteration of weld properties. Feed roll (not shown) is mounted on the clamping frame 12 of the welder 10 in the same manner as take-up roll 54 and a complimentary guide (not shown) may also be provided, if desired, on the feed side of the welder 10 in order to guide the shim material 105 from the feed roll (not shown).

It will, of course, be appreciated that the subject method and apparatus are not limited exclusively for use in association with ultrasonic vibratory welding equipment but may also be used in association with resistance spot welding procedures wherein thermal energy is emitted from its welding tip to effect welding of the workpieces. Periodically, resistance spot welds in a production environment must be shut down for cleaning and reshaping of the welding tips. Depending upon the particular parts being welded and the permissible quality of the resultant welds, tip cleaning must be done after between 5 and about 25 welds. Under certain conditions and where certain agents are applied to exterior surfaces, up to 50 or 60 welds may be effected before cleaning is required.

The method and apparatus of the subject invention may therefore be utilized in that environment. To demonstrate the effectiveness of the subject method and apparatus, trials were conducted using shims of 0.005" thick beryllium/copper when welding together using a resistance spot welder sheets of 2024-T3 alclad which were 0.025" thick. Copper based shim material was used since it acts as a conductor similar in character to the welder tip material and would have no deleterious affect relative to current flow. These trials demonstrated that welding occurred in a natural way with some aluminum being transferred to the shim material where it was carried away before subsequent welding. Subsequent trials on sheets of 2024-T3 alclad, which were 0.050" thick, resulted in good repeatable welds with no build-up or alteration of the welding tip surface. These trials demonstrate that such method and apparatus can similarly be used with resistance spot welding apparatus which would eliminate the necessity for repeated cleaning of the welding tip which can result in a savings of from one-half to three-quarters of the time required to make resistance welded assemblies.

Having thus described the invention with particular reference to the preferred forms thereof, it will be obvious that various changes and modifications may be made thereon without departing from the spirit and scope of the invention as defined by the appended claims.

Wherefore, we claim:

1. Ultrasonic vibratory spot welding apparatus of the type having a vibratory welding tip and a complimentary anvil both mounted on a stationary welding frame so as to define a throat into which workpieces may be inserted for welding, said vibratory welding tip comprising one end of a vibratory reed which is connected to a transducer adapted to transmit lateral vibrations and adapted to introduce into and through said workpieces a sufficient amount of high frequency vibratory energy in order to effect a weld between said workpieces, said apparatus including means for continuously inserting between said vibratory welding tip and said workpieces shim material having a hardness greater than the hardness of said workpieces, said shim material being adapted to be releasably welded to said workpieces in order to prevent vibratory welding tip sticking between said vibratory welding tip and said workpieces.

2. The ultrasonic vibratory spot welding apparatus of claim 1 wherein said shim material comprises tempered steel having a blue oxide coating.

3. The ultrasonic vibratory spot welding apparatus of claim 2 wherein the thickness of said shim material is between about 0.002" and 0.010".

4. The ultrasonic vibratory spot welding apparatus of claim 1 wherein the thickness of said shim material is between about 0.003" and about 0.005".

5. The ultrasonic vibratory spot welding apparatus of claim 1 wherein said means to continuously insert shim material comprises a motor-driven take-up reel adapted to sequentially index and draw said shim material across said vibratory welding tip after the completion of each weld.

* * * * *